United States Patent
Patel et al.

(10) Patent No.: US 7,534,748 B2
(45) Date of Patent: May 19, 2009

(54) POLYMERIC POLYOL ESTERS FROM TRIHYDRIC POLYOLS FOR USE IN METAL WORKING WITH IMPROVED SOLUBILITY

(75) Inventors: Harish R. Patel, Spartanburg, SC (US); John A. Kimes, Spartanburg, SC (US)

(73) Assignee: The Lubrizol Corporation, Wickliffe, OH (US)

( * ) Notice: Subject to any disclaimer, the term of this patent is extended or adjusted under 35 U.S.C. 154(b) by 591 days.

(21) Appl. No.: 10/508,275

(22) PCT Filed: Mar. 13, 2003

(86) PCT No.: PCT/US03/08244

§ 371 (c)(1),
(2), (4) Date: Mar. 11, 2005

(87) PCT Pub. No.: WO03/080772

PCT Pub. Date: Oct. 2, 2003

(65) Prior Publication Data

US 2005/0170977 A1    Aug. 4, 2005

(51) Int. Cl.
*C10M 169/04*    (2006.01)
*C10M 145/22*    (2006.01)
*C08G 63/48*    (2006.01)

(52) U.S. Cl. ......................... 508/455; 508/506; 508/507; 525/10

(58) Field of Classification Search ................. 508/455
See application file for complete search history.

(56) References Cited

U.S. PATENT DOCUMENTS

| | | | | |
|---|---|---|---|---|
| 3,697,428 A | * | 10/1972 | Widmer et al. | 508/492 |
| 4,740,322 A | * | 4/1988 | DiBiase et al. | 508/331 |
| 5,346,635 A | * | 9/1994 | Khorramian | 508/210 |
| 5,698,502 A | | 12/1997 | Pafford et al. | 508/485 |
| 5,798,322 A | | 8/1998 | Brannen et al. | 508/442 |
| 2002/0055440 A1 | * | 5/2002 | Balasubramaniam | 508/187 |

FOREIGN PATENT DOCUMENTS

| | | | |
|---|---|---|---|
| GB | 665595 | | 1/1952 |
| GB | 1215214 | | 12/1970 |
| GB | 1215214 | A * | 12/1970 |

* cited by examiner

*Primary Examiner*—Glenn Caldarola
*Assistant Examiner*—Jim Goloboy
(74) *Attorney, Agent, or Firm*—Samuel B. Laferty; Michael F. Esposito

(57) ABSTRACT

Polymeric polyol ester additives for metal working applications are described that have lower pour points and improved solubility in API Group II and III basestocks. The polyol esters are made from tri and/or tetrahydric alcohols, a linear fatty monocarboxylic acid, a short dioic acid, and a alk(en)yl substituted succinic acid or its anhydride.

21 Claims, No Drawings

POLYMERIC POLYOL ESTERS FROM TRIHYDRIC POLYOLS FOR USE IN METAL WORKING WITH IMPROVED SOLUBILITY

FIELD OF THE INVENTION

Polymeric polyol ester additives having compatibility with paraffinic mineral oil basestocks (hydrotreated) and usefulness in metalworking applications are described. While these polymeric polyol ester molecules are generally free of phosphorus, sulfur, and other heteroatoms (other than oxygen, carbon, and hydrogen) they can be part of an additive package that includes sulfurized hydrocarbons and phosphorus containing antiwear or extreme pressure additives.

BACKGROUND OF THE INVENTION

Metalworking operations include for example, rolling, forging, hot-pressing, blanking, bending, stamping, drawing, cutting, punching, spinning and the like and generally employ a lubricant to facilitate the same. Lubricants generally improve these operations in that they can provide films of controlled friction or slip between interacting metal surfaces and thereby reduce the overall power required for the operations, and prevent sticking and decrease wear of dies, cutting bits and the like. Sometimes the lubricant is expected to help transfer heat away from a particular metalworking contact point. In addition the metal working fluid may provide a residual film on the metal part thereby adding a corrosion inhibiting property to the metal being processed.

Metal working fluids often comprise a carrier fluid and a multitude of specialty additives. The carrier fluid imparts some general lubricity to the metal surface and carries/delivers the specialty additives to the metal surfaces. The specialty additives can impart a variety of properties including friction reduction beyond hydrodynamic film lubrication, metal corrosion protection, extreme pressure or antiwear effects, etc.

Carrier fluids include various petroleum distillates include American Petroleum Institute Group I-V basestocks and/or water. Group I basestocks are primarily direct fractional distillation products of petroleum. Group II and III basestocks are further refined petroleum products such as hydrotreated distillation products that have reduced amounts of unsaturation (e.g. less than 1 wt. %) and cyclic distillation products. The specialty additives can exist within the carrier fluid in a variety of forms including as dissolved, dispersed in, and partially soluble materials. Some of the metal working fluid is lost to or deposited on the metal surface during the working process; some is lost to the environment as spillage, sprays, etc; and some is recyclable if the carrier fluid and additives haven't degraded significantly during use. Due to entry of a percentage of the metal working fluid into process goods and industrial process streams, it is desirable if the components to the metal working fluid are eventually fully biodegradable and pose little risk of bioaccumulation.

Polymeric polyol esters exhibit compatibility with and some solubility with both hydrocarbon oils and water carrier fluids, depending on molecular structure, molecular weight etc. They are biodegradable and if they don't contain other heteroatoms pose little risk of bioaccumulation. Polymeric polyol esters from pentaerythritol are known as additives for metalworking but suffer from compatibility problems at some temperatures with some lubricant basestocks materials.

SUMMARY OF THE INVENTION

Polymeric polyol esters with improved solubility characteristics and lower acid numbers can be prepared using a portion of a trihydric alcohol like trimethylolpropane to replace a portion or all of the of pentaerythritol in a polymeric polyol ester used as a lubricant additive for metalworking. It might have been anticipated that a polyol ester including trimethylolpropane would have less short chain branching and thus reduced solubility in solvents or Group II and III basestocks, but experimental data confirms that in many instances incorporation of trimethylolpropane as a partial or complete replacement for pentaerythritol results in enhanced solubility.

Another benefit of partial or complete replacement of pentaerythritol is that lower acid numbers are obtained in these particular polymer formulations when trimethylolpropane is part or all of the total polyol charge. Typically in polyol esters of this type made with pentaerythritol as the sole polyol, the acid numbers are about 20 mgKOH/g of additive. When trimethylolpropane replaces about 50 mole percent of the pentaerythritol under the same reaction conditions, the acid number can readily be reduced to less than 8 mgKOH/g and more desirably less than 5 mgKOH/g. When trimethylolpropane replaces all of the polyol, the acid number can go below 5 mgKOH/g and more desirably less than 3 mgKOH/g. Higher acid numbers are undesirable to the extent that they promote coupling of polymer chains, which can significantly reduce the solubility of polymeric polyol esters in hydrocarbon oils.

DETAILED DESCRIPTION OF THE INVENTION

The polymeric polyol ester of this disclosure is made from the following components. The first is a generally linear monocarboxylic acid where R is an alk(en)yl group of 11 to 19 carbon atoms.

The second is an alkanedioic acid such as adipic acid shown below.

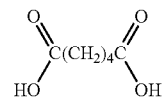

The third is an alk(en)yl substituted succinic acid or its anhydride where $R_1$ has from 15 to 20 carbon atoms.

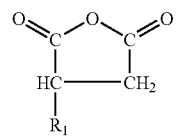

The fourth is a trihydric alcohol and in the preferred embodiment is trimethylolpropane as shown below.

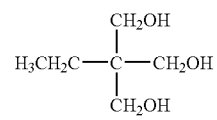

The fifth component in embodiment A is not present in any substantial amount in embodiment B. The fifth component when present is pentaerythritol as shown below.

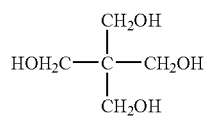

When these components 1-5 are reacted it can form a polymeric polyol ester as described in embodiment A and shown below. A variety of isomeric variations therefrom with more numerous side chain branches is anticipated rather than a strictly linear structure as shown.

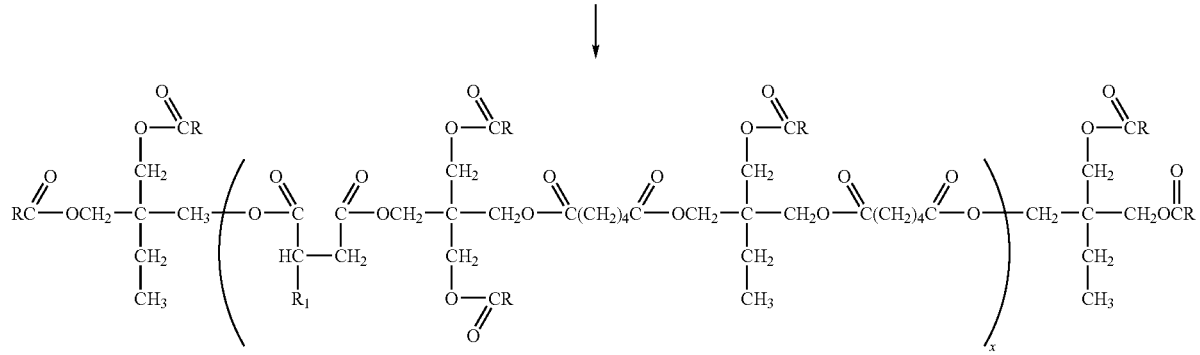

The polymeric polyol ester is manufactured from four or five different components depending on whether one is making embodiment A including about 50-60 percent trihydric alcohol based on the polyhydric alcohol components or embodiment B including about 90-100 percent trihydric alcohol based on the polyhydric alcohol component. The inclusion of pentaerythritol is the major difference between embodiment A and embodiment B.

The first component in the polymeric polyol ester is a substantially linear monocarboxylic acid having form about 12 to about 20 carbon atoms. Examples of these acids are coco fatty acid and tall oil fatty acid. These acids have some paraffinic nature and are thought to therefore favorably interact with the highly linear paraffinic oils of the Group II and Group III basestocks. Since this component is monofunctional in the condensation polymerization, larger amounts of it help minimize the molecular weight. In embodiment A these (repeating units derived from monocarboxylic acids) are present in amounts from about 40 to 70 wt. %, more desirably from about 40 to 60 wt. %, and preferably from about 50-55 wt. % based on the weight of all the components in the polymeric polyol ester. In this disclosure repeating unit will be used to describe the acid, diacid, or polyol component to a repeating unit, while a more academic approach might require a repeating unit to include both an acid component and an alcohol component. This will be used interchangeably with wt. % of the repeating units from the particular acid, diacid, or polyol of the polyol ester since the difference in weights of the precursors and the fragment derived therefrom in the repeating units will be insubstantial. In embodiment B the amounts of linear monocarboxylic acids will be from about 10 to 90 and more preferably from about 30 to 60 wt. %.

The second component is an alkanedioic acid having from 4 to 6 carbon atoms. A preferred alkanedioic acid is adipic acid. This component is primarily a chain extender for the formation of the polyol ester. The alkanedioic acid is desirably present in embodiment A in an amount from about 5 to 30 wt. %, more desirably from about 10 to 20 wt. %, and preferably from about 12 to 15 wt. % based on all of the repeating units in the polymeric polyol ester. The alkanedioic acid is desirably present in embodiment B in an amount from about 5 to 30 wt. % and more desirably from about 10 to 15 wt. % based on all of the repeating units in the polymeric polyol ester.

The third component is an alk(en)yl substituted succinic acid or its anhydride. Alk(en)yl is shorthand for the term alkyl or alkenyl with alkenyl varying from alkyl by the inclusion of one or more carbon to carbon double bonds in the molecule fragment. While unsaturation is not particularly desirable in the alk(en)yl substituted succinic acid or its anhydride, it is understood that some unsaturation may be presence due to the chemical reactions used to form the alk(en)yl substituted succinic acid reactant. The alk(en)yl group desirably has from about 15-20 carbon atoms so the entire molecule has about 19-24 carbon atoms along with the respective amount of hydrogen and oxygen atoms. A preferred alk(en)yl group would include one with one or more aliphatic branches and a desirable example would be isooctadecyl group resulting in isooctadecyl succinic anhydride. While the anhydride of succinic acid is listed, it is understood that in the final polymer the anhydride has opened to appear in the polyol ester as the esterification product of alk(en)yl succinic acid. Desirably the alk(en)yl succinic acid or its anhydride is present in embodiment A as repeating units in the polymeric polyol ester as from about 10 to 20 wt. %, more desirably from about 12 to 16 wt. %, and preferably from about 14 to 15 wt. % based on all of the repeating units therein. Desirably the alk(en)yl succinic acid or its anhydride is present in embodiment B as repeating units in the polymeric polyol ester as from about 1 to 50 wt. %, more desirably from about 5 to 30 wt. %, and preferably from about 10 to 20 wt. %.

The fourth component is the trihydric polyol. While a variety of trihydric alcohols could be used having from about 4 to 10 carbon atoms, trimethylolpropane is preferred due to the chemical stability of polyol esters made from trimethylolpropane relative to other trihydic alcohols. Desirably in embodiment A the trihydric alcohol is present from about 8 to 20 wt. %, more desirably from about 9 to 13 wt. % in the repeating units, and preferably from about 11 to 12 wt. % based on all of the repeating units. Desirably in embodiment B the trihydric alcohol is present from about 5 or 10 to 30 wt. % in the repeating units and more desirably from about 10 to 20 wt. % based on all of the repeating units.

The fifth component, pentaerythritol, is only present in embodiment A and not present intentionally in embodiment B. Pentaerythritol has the structure already shown. It is preferred over other tetrahydric alcohols because the particular structure with the (central) beta carbon from all the oxygen atoms of the hydroxyl groups lacks any attached hydrogen atoms. This helps prevent some chemical reactions that occur when the beta carbon from a hydroxyl group has a hydrogen atom(s) that can be abstracted. While pentaerythritol is generally defined by the formula given, it is well known that commercial sources of pentaerythritol generally include trace amounts of dimer, trimer and higher oligomers from coupling pentaerythritol. For the purposes of this application and the claims the term pentaerythritol will include the generally commercially acceptable forms thereof that include some dimer, trimer, etc. Pentaerythritol is desirably present in embodiment A in an amount from about 5 to 15 wt. %, more desirably about 7 to 10 wt. % and preferably about 8 to 9 wt. %.

The polymeric polyol ester can be present in a metal working from trace amounts to large amounts depending upon the application. In most conventional applications the use rate would be about 0.05 to about 50 wt. % and more desirably from about 0.1 to about 25 wt. % of this polymeric polyol ester in a hydrocarbon diluent oil. This particular polymeric polyol ester can be used with a wide variety of natural and synthetic oils that might be useful in metal working applications. This particular polymeric polyol ester has a lower pour point than polymeric polyol esters from pentaerythritol alone and similar acids and thus is more easily handled and measured at lower temperatures (requires no heating or less heating to achieve pumpable neat viscosities).

The molecular weight of this polymeric polyol can be adjusted to achieve optimal solubility and compatibility with other components in the metal working fluid (e.g. the diluent oil). The number average molecular can vary from about 10,000 to about 1,000,000 for most applications and more desirably from about 20,000 to about 500,000. To achieve maximum solubility polymeric polyol esters often have number molecular weights controlled to 20,000 to 100,000. Acid number and hydroxyl number of the polymeric polyol ester are influenced by the molecular weight. In this application neither a large excess of residual hydroxyl nor acid groups is desirable. Thus the stoichiometry of the acid groups and hydroxyl groups is near equivalent and might be expected to vary by 1, 2, or 3 mole percent up to 10 mole percent. Acid numbers of less than 20 and more desirably less than 10, 8, 5 or 3 mg KOH/g polymer are preferred by the industry but higher acid numbers would not necessarily preclude use as a metal working additive.

These polymeric polyol esters can be made with a variety of processes well known in the art. Since it is a condensation polymerization it is desirable to purge water out of the reactants to push the condensation reaction towards completion. A diluent may be used. A suggested procedure used to make these includes mixing the reactants in a stirred reactor under an inert gas such as nitrogen and at a temperature of about 240-255 C until the acid number is acceptable (e.g. normally the reaction was stopped at an acid number between 3-8 mgKOH/g of polymer). This typically was 6-8 hours using the reactants of embodiment A.

The polymeric polyol ester need not be the only additive in a metal working fluid. These additives work well with phosphorus and/or sulfur containing extreme pressure (EP) additives. The polymeric polyol esters can function as a partial EP replacement for chloroparaffin EP additives when used with a sulfur and/or phosphorus EP additives. The polymeric polyol esters work well with the organic phosphorus compounds listed in U.S. Pat. No. 5,798,322 as additives for metal working in combination with the polymeric polyol ester additives in that patent. U.S. Pat. No. 5,798,322 is hereby incorporated by reference for its teachings on metal working formulation in general and its teachings on additives/variations on formulations using polymeric polyol ester additives.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. While ranges are given for most of the elements of the invention independent of the ranges for other elements, it is anticipated that in more preferred embodiments of the invention, the elements of the invention are to be combined with the various (assorted) desired or preferred ranges for each element of the invention in various combinations. As used herein, the expression "consisting essentially of" permits the inclusion of substances that do not materially affect the basic and novel characteristics of the composition under consideration.

What is claimed is:

1. A polymeric polyol ester additive for metal working comprising
   a) about 40-70 wt. % repeating units from a substantially linear monocarboxylic acid having from 12 to 20 carbon atoms,
   b) about 5-30 wt. % repeating units from an alkanedioic acid having from 4-6 carbon atoms,
   c) repeating units from a alk(en)yl substituted succinic acid or its anhydride wherein said alk(en)yl group is an alkyl or alkenyl group,
   d) about 8-20 wt. % repeating units from trihydric alcohol, and
   e) about 5-15 wt. % repeating units from pentaerythritol.

2. The composition of claim 1, wherein said polymeric polyol ester molecule as manufactured is substantially free of phosphorus atoms and sulfur atoms.

3. The composition of claim 1, wherein the amount of repeating units from monocarboxylic acid is from about 40 to 60 wt. %.

4. The composition of claim 1, wherein the amount of repeating units from alk(en)yl substituted succinic acid or its anhydride is from about 12-16 wt. %.

5. The composition of claim 1, wherein the amount of repeating units from said alkanedioic acid is from about 12-20 wt. %.

6. The composition of claim 1, wherein the amount of repeating units from trihydric alcohol is from 9-13 wt. % and the amount of repeating units from pentaerythritol is from about 7-10 wt. %.

7. The composition of claim 1 diluted to 0.05 to 50 wt. % in at least 50 wt. % of a Group II or Group III basestock as defined by the American Petroleum Institute.

8. A process of using of a composition according to claim 7 as a lubricant between interacting metal surfaces in a metal working fluid including at least one step of stamping, cutting, and/or bending one of said metal surfaces.

9. The composition of claim 7 further including any combination of lubricating sulfur or phosphorus containing extreme pressure additives.

10. The composition of claim 1, wherein said polymeric polyol ester has a number average molecular weight from about 10,000 to about 1,000,000.

11. The composition of claim 1, wherein at least 50 wt. % of said monocarboxylic acid is a coco fatty acid or tall oil fatty acid, at least 50 wt. % of said alk(en)yl substituted succinic acid or its anhydride is a isooctadecyl succinic acid or anhydride, at least 50 wt. % of said akanedioic acid is adipic acid, and at least 50 wt. % of the trihydric alcohol is trimethylolpropane.

12. A polymeric polyol ester additive for metal working comprising
   a) about 10-90 wt. % repeating units from a substantially linear monocarboxylic acid having from 12 to 20 carbon atoms,
   b) about 5-30 wt. % repeating units from an alkanedioic acid having from 4-6 carbon atoms,
   c) about 5-30 wt. % repeating units from a alk(en)yl substituted succinic acid or its anhydride wherein said alk(en)yl group is an alkyl or alkenyl group, and
   d) about 5-30 wt. % repeating units from trihydric alcohol.

13. The composition of claim 12, wherein said polymeric polyol ester molecule as manufactured is substantially free of phosphorus atoms and sulfur atoms.

14. The composition of claim 12, wherein the amount of repeating units from monocarboxylic acid is from about 30-60 wt. %.

15. The composition of claim 12, wherein the amount of repeating units from alk(en)yl substituted succinic acid or its anhydride is from about 10-20 wt. %.

16. The composition of claim 12 wherein the amount of repeating units from said alkanedioic acid is from about 10-15 wt. %.

17. The composition of claim 1, wherein the amount of repeating units from trihydric alcohol is from 10-20 wt. %.

18. The composition of claim 12 diluted to 0.05 to 50 wt. % in at least 50 wt. % of a Group II or Group III basestock as defined by the American Petroleum Institute.

19. A process of using a composition according to claim 12 as a lubricant between interacting metal surfaces in a metal working fluid including at least one step of stamping, cutting, and/or bending one of said metal surfaces.

20. The composition of claim 12 further including lubricating sulfur or phosphorus containing extreme pressure additives.

21. The composition of claim 12, wherein said polymeric polyol ester has a number average molecular weight from about 10,000 to about 1,000,000.

* * * * *